United States Patent
Noda et al.

(10) Patent No.: US 10,232,355 B2
(45) Date of Patent: Mar. 19, 2019

(54) CARBON NANOTUBE-COATED CATALYST PARTICLE

(71) Applicant: NATIONAL UNIVERSITY CORPORATION GUNMA UNIVERSITY, Maebashi-shi, Gunma (JP)

(72) Inventors: Reiji Noda, Maebashi (JP); Ryosuke Atsumi, Maebashi (JP); Kyoya Wanibuchi, Maebashi (JP)

(73) Assignee: NATIONAL UNIVERSITY CORPORATION GUNMA UNIVERSITY, Maebashi (JP)

( * ) Notice: Subject to any disclaimer, the term of this patent is extended or adjusted under 35 U.S.C. 154(b) by 0 days.

(21) Appl. No.: 15/555,542

(22) PCT Filed: Mar. 1, 2016

(86) PCT No.: PCT/JP2016/056279
§ 371 (c)(1),
(2) Date: Sep. 4, 2017

(87) PCT Pub. No.: WO2016/140227
PCT Pub. Date: Sep. 9, 2016

(65) Prior Publication Data
US 2018/0043339 A1    Feb. 15, 2018

(30) Foreign Application Priority Data

Mar. 4, 2015 (JP) .................................. 2015-042678

(51) Int. Cl.
*B01J 23/755* (2006.01)
*B01J 35/02* (2006.01)
(Continued)

(52) U.S. Cl.
CPC ............... *B01J 23/755* (2013.01); *B01J 8/18* (2013.01); *B01J 21/04* (2013.01); *B01J 21/185* (2013.01);
(Continued)

(58) Field of Classification Search
None
See application file for complete search history.

(56) References Cited

U.S. PATENT DOCUMENTS

2010/0276644 A1* 11/2010 Wolf ..................... B01J 23/002
                                                                    252/512
2011/0212016 A1    9/2011 Lee et al.
(Continued)

FOREIGN PATENT DOCUMENTS

JP    2004-253224 A    9/2004
JP    2008-066230 A    3/2008
(Continued)

OTHER PUBLICATIONS

Yin, Shuang-Feng, et al. "Nano Ru/CNTs: a highly active and stable catalyst for the generation of COx-free hydrogen in ammonia decomposition." Applied Catalysis B: Environmental 48.4 (2004): 237-241.*

(Continued)

*Primary Examiner* — Richard M Rump
(74) *Attorney, Agent, or Firm* — Leydig, Voit & Mayer, Ltd.

(57) ABSTRACT

The present invention applies carbon nanotubes to catalyst particles, thereby providing catalyst particles which are usable in fluidized bed reactions, have high catalytic activity, and are easy to handle. The catalyst particles are carbon nanotube-coated catalyst particles which each comprise a carrier particle and a coating layer disposed on the surface of the carrier particle, wherein the carrier particles are (Continued)

flowable in fluidized beds and the coating layer comprises carbon nanotubes which have metal nanoparticles supported thereon and/or which have been doped with nitrogen or boron. The carbon nanotube-coated catalyst particles are flowable in fluidized bed reactions.

20 Claims, 3 Drawing Sheets

(51) Int. Cl.
| | |
|---|---|
| B01J 35/06 | (2006.01) |
| B01J 37/02 | (2006.01) |
| B82Y 30/00 | (2011.01) |
| C01B 32/158 | (2017.01) |
| C01B 32/168 | (2017.01) |
| B01J 8/18 | (2006.01) |
| B01J 21/04 | (2006.01) |
| B01J 21/18 | (2006.01) |
| B01J 23/745 | (2006.01) |
| B01J 35/00 | (2006.01) |
| C01B 3/04 | (2006.01) |
| C01B 21/02 | (2006.01) |
| B82Y 40/00 | (2011.01) |

(52) U.S. Cl.
CPC ......... *B01J 23/745* (2013.01); *B01J 35/0006* (2013.01); *B01J 35/0013* (2013.01); *B01J 35/02* (2013.01); *B01J 35/06* (2013.01); *B01J 37/02* (2013.01); *B01J 37/0221* (2013.01); *B01J 37/0244* (2013.01); *B82Y 30/00* (2013.01); *C01B 3/047* (2013.01); *C01B 21/02* (2013.01); *C01B 32/158* (2017.08); *C01B 32/168* (2017.08); *B82Y 40/00* (2013.01); *Y10S 977/748* (2013.01); *Y10S 977/843* (2013.01); *Y10S 977/847* (2013.01)

(56) References Cited

U.S. PATENT DOCUMENTS

| | | |
|---|---|---|
| 2012/0214664 A1 | 8/2012 | Mordkovich et al. |
| 2012/0219490 A1 | 8/2012 | Noda et al. |
| 2012/0238021 A1 | 9/2012 | Hashim et al. |
| 2013/0058862 A1 | 3/2013 | Okamura et al. |

FOREIGN PATENT DOCUMENTS

| | | |
|---|---|---|
| JP | 2012-011373 A | 1/2012 |
| JP | 2012-506312 A | 3/2012 |
| JP | 2013-509290 A | 3/2013 |
| WO | WO 2011/030821 A1 | 3/2011 |

OTHER PUBLICATIONS

Zaman et al., "Fischer-Tropsch synthesis over cobalt dispersed on carbon nanotubes-based supports and activated carbon," *Fuel Processing Technology*, 90(10): 1214-1219 (2009).

Japanese Patent Office, International Preliminary Report on Patentability in International Application No. PCT/JP2016/056279 (dated Sep. 8, 2017).

Japanese Patent Office, International Search Report in International Patent Application No. PCT/JP2016/056279 (dated May 17, 2016).

* cited by examiner

CARBON NANOTUBE-COATED CATALYST PARTICLE

CROSS-REFERENCE TO RELATED APPLICATIONS

This patent application is the U.S. national phase of International Patent Application No. PCT/JP2016/056279, filed on Mar. 1, 2016, which claims the benefit of Japanese Patent Application No. 2015-042678, filed Mar. 4, 2015, the disclosures of which are incorporated herein by reference in their entireties for all purposes.

TECHNICAL FIELD

The present invention relates to a carbon nanotube-coated catalyst particle.

BACKGROUND ART

Carbon nanotubes are innovative carbon materials having a characteristic structure with a tubular graphene sheet, and are substances expected to be applied to various fields due to their mechanical and chemical characteristics and high electrical conductivity derived from the laminated structure of graphene sheets.

It has been reported that since carbon nanotubes are themselves nanoscale fiber materials, they have a high specific surface area, so that various catalyst metals can be supported thereon in a highly dispersed state, and as a result, carbon nanotubes have a high carrier effect in various reactions. Examples of reaction systems in which the high carrier effect of carbon nanotubes has been observed include electrode catalysts for fuel cells, dry methane reforming, Fischer-Tropsch synthesis catalysts, and sodium borohydride decomposition catalysts for hydrogen production (e.g. Patent Literature 1).

PRIOR ART REFERENCES

Patent Literature

Patent Literature 1: JP 2004-253224 A

SUMMARY OF THE INVENTION

Problems to be Solved by the Invention

In a catalytic reaction, more efficient reactions and improved catalytic activities are further demanded. While carbon nanotubes are expected to be applied to various fields including catalytic reactions, they have problems such as handling difficulties.

Generally, when the reaction rate on the surface of a metal catalyst is sufficiently fast, the diffusion process and the heat transfer process are rate limiting steps. Since fixed bed catalytic reactors are relatively poor in heat transfer, effective execution of heat supply and heat removal requires the use of a fluidized bed reactor rather than a fixed bed reactor. However, despite their high carrier effect, carbon nanotubes have a problem that it is difficult to carry out a catalytic reaction while maintaining the formation of a stable fluidized bed, because carbon nanotubes are extremely light due to being a nanoscale fiber material, jump out of the fluidized bed and have a high aspect ratio themselves.

In view of the above-described problems, an object of the present invention is to apply carbon nanotubes to catalyst particles, thereby providing catalyst particles which are usable in fluidized bed reactions, have high catalytic activity, and are easy to handle.

Means for Solving the Problems

The present inventors intensively studied to conceive providing carrier particles with a coating layer comprising carbon nanotubes which have metal nanoparticles supported thereon and/or which have been doped with nitrogen or boron on the surface thereof, thereby using them as catalyst particles having high activity.

Thus, the present invention is as follows.

[1] A carbon nanotube-coated catalyst particle comprising a carrier particle and a coating layer disposed on a surface of the carrier particle, wherein:
the carrier particle is flowable in a fluidized bed;
the coating layer comprises a carbon nanotube which has a metal nanoparticle supported thereon and/or which has been doped with nitrogen or boron; and
the catalyst particle is flowable in a fluidized bed reaction.
[2] The carbon nanotube-coated catalyst particle described in [1], wherein the coverage of the coating layer comprising the carbon nanotube is 10% or more and 50% or less.
[3] The carbon nanotube-coated catalyst particle described in [1] or [2], wherein the carrier particle is a porous ceramic particle.
[4] The carbon nanotube-coated catalyst particle described in [3], wherein the porous ceramic particle includes at least one selected from the group consisting of alumina, silica, zeolite, titanium oxide, zirconia, lanthanum oxide and ceria.
[5] The carbon nanotube-coated catalyst particle described in any one of [1] to [4], wherein the metal nanoparticle includes at least one selected from the group consisting of ruthenium, iron and nickel.
[6] The carbon nanotube-coated catalyst particle described in any one of [1] to [5], wherein the catalyst particle is for use in ammonia decomposition.
[7] A process for producing a carbon nanotube-coated catalyst particle, the process comprising the steps of:
supporting a metal particle on a carrier particle surface;
growing a carbon nanotube from the metal particle as a base point; and
supporting a metal nanoparticle on the carbon nanotube and/or doping the carbon nanotube with nitrogen or boron,
wherein the carrier particle is flowable in a fluidized bed;
wherein the catalyst particle is flowable in a fluidized bed reaction.
[8] The process for producing a carbon nanotube-coated catalyst particle of [7], wherein the step of growing the carbon nanotube is fluidized bed CVD.
[9] A carbon nanotube-coated catalyst particle capable of flowing in a fluidized bed, the catalyst particle being produced by the process for producing a carbon nanotube-coated catalyst particle described in [8].
[10] A method for using the carbon nanotube-coated catalyst particle described in any one of [1] to [6] and [9] or the carbon nanotube-coated catalyst particle produced by the process described in [7] or [8] as a catalyst in a fluidized bed reaction.

Effect of the Invention

The present invention provides a carbon nanotube-coated catalyst particle which is usable in fluidized bed reactions, has high catalytic activity, and is easy to handle.

MODE FOR CARRYING OUT THE INVENTION

The present invention will now be described in detail according to embodiments. However, the present invention is not limited to the embodiments explicitly or impliedly described herein. All aspects of the present invention can be carried out in combination or alone.

In one embodiment of the present invention, the catalyst particles are carbon nanotube-coated catalyst particles which each comprise a carrier particle and a coating layer disposed on the surface of the carrier particle, wherein the carrier particles are flowable in fluidized beds and the coating layer comprises carbon nanotubes which have metal nanoparticles supported thereon and/or which have been doped with nitrogen or boron, and wherein the carbon nanotube-coated catalyst particles are flowable in fluidized bed reactions. The catalyst particle of the present invention is herein also referred to as carbon nanotube-coated catalyst particle.

Figure 1:
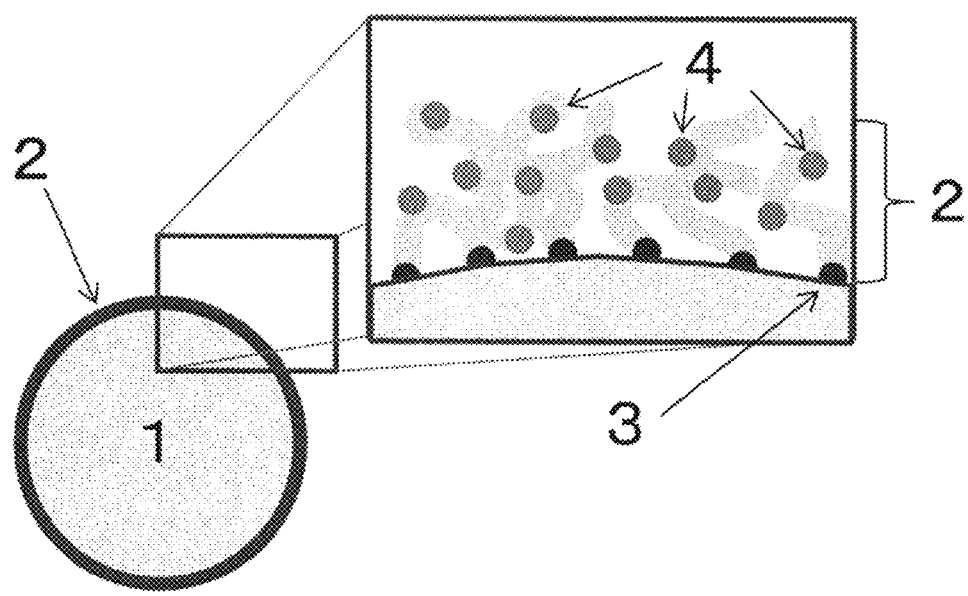
FIG. 1 is a schematic view showing the carbon nanotube-coated catalyst particle of the present invention.

A schematic view showing the carbon nanotube-coated catalyst particle of the present invention is shown in FIG. 1. Referring to FIG. 1, the carbon nanotube-coated catalyst particle of the present invention will be described.

The catalyst particle of the present invention comprises a carrier particle 1 having on its surface a coating layer 2 comprising carbon nanotubes which have metal nanoparticles supported thereon and/or which have been doped with nitrogen or boron. In the present specification, a carbon nanotube coating layer is referred to as "carbon nanotube coating layer" as long as it covers a carrier particle regardless of whether or not metal nanoparticles are supported and/or nitrogen or boron doping.

The carrier particles that can be used for the catalyst particles of the present invention are not particularly limited as long as they are flowable in fluidized beds. "Flowable in fluidized beds" means that particles having an average particle size of about 10 to 1000 μm suspended in a gas flowing at a gas flow rate of 0.1 to 20 m/sec are mixed in fluidized beds. Examples of the carrier particles include ceramic particles, and carbon materials having a high specific surface area. The carrier particles may also be hollow particles. By using such particles, it is easy to realize catalyst particles that can flow in fluidized beds when formed into carbon nanotube-coated catalyst particles. "Flowable in fluidized bed reactions" means that particles having an average particle size of about 10 to 1000 μm suspended in a reaction under a gas flow at a gas flow rate of 0.1 to 20 m/sec are mixed in fluidized beds.

The ceramic particles are not particularly limited, but solid base particles such as magnesia are preferable from the viewpoint of carbon nanotube synthesis. At least one selected from the group consisting of alumina, porous silica, zeolite, magnesia, titanium oxide, zirconia, lanthanum oxide and ceria is preferably included, and more preferably included is at least one selected from the group consisting of alumina, porous silica, and magnesia. Ceramic particles can be prepared by using, for example, a sol-gel process, or commercially available activated alumina manufactured by Wako Pure Chemicals or the like can also be used. From the viewpoint of durability porous activated alumina is preferred.

Carbon materials having a high specific surface area include so-called activated carbon and the like and are not restricted as long as they have a high specific surface area. The specific surface area can be determined by BET method, and preferably is 100 $m^2/g$ or more, and more preferably is 300 $m^2/g$ or more. Commercially available carbon materials can be used and include, for example, activated carbon produced by Wako Pure Chemicals.

The size of the carrier particles is on the order of μm, and the particle size can be measured using a sieve. When the particle size distribution is sharp, particles having a particle size of about 30 μm can be used, but the lower limit of the particle size is usually 50 μm or more, preferably 60 μm or more, more preferably 70 μm or more. When the particle size is less than 50 μm, the adhesion force among the particles becomes relatively large, and the particles easily aggregate. From the viewpoint of flowability, the upper limit of the particle size is usually 200 μm or less, preferably 190 μm or less, more preferably 180 μm or less, still more preferably 150 μm or less. By setting the upper limit to 200 μm or less, it is possible to suppress the gas flow rate also in reactions in fluidized bed reactors. In usual, the particle size of the carrier particle is allowed to vary. Carrier particles having a particle size deviating from the above-described range may be contained as long as the effect of the present invention is not impaired, and when the particle size distribution is sharp, particles of about 30 μm can be used.

In the present embodiment, the coating layer 2 comprising carbon nanotubes is one that has metal nanoparticles supported thereon and/or is doped with nitrogen or boron. That is, the catalyst function is exerted through the binding between the metal nanoparticles and the carbon nanotube surface and/or the incorporation of nitrogen or boron into the grapheme sheet structure.

The coating layer 2 comprising carbon nanotubes (also referred to as coating layer) is usually grown from the metal particles 3 (also referred to as supported metal particles) bonded on the surface of carrier particles as a base point. As shown in FIG. 1, the coating layer 2 may entirely cover the surface of the carrier particle or partially cover it. The coating layer 2 may coat the carrier particles in a three-dimensionally entangled form.

The carbon nanotube constituting the coating layer 2 may be single-walled or multi-walled, and is preferably multi-walled. The diameter is preferably 20 nm or more, more preferably 50 nm or more, from the viewpoint of supporting catalyst metals. The diameter is preferably 100 nm or less, more preferably 50 nm or less, from the viewpoint of supporting highly dispersed catalyst metals. The diameter of the carbon nanotube can be obtained by observation using a transmission electron microscope (TEM).

Since the diameter of the carbon nanotube is close to the particle size of the metal particle 3, the diameter of the carbon nanotube can be controlled via the particle size of the metal particle 3.

As the metal particle 3, metals having a graphitizing ability are used. Specific examples of the metals include Fe, Ni, Mo, Co, and alloys thereof. From the viewpoint of graphitizing ability, Fe or Fe—Mo is preferred. The average particle size of the metal particles 3 is usually nano size of about 30 nm or less. From the viewpoint of supporting highly dispersed catalyst metal, the average particle size is preferably 20 nm or less. From the viewpoint of supporting catalyst metals, the average particle size is usually 5 nm or more. The supported amount of the metal particles 3 is determined depending on the intended coverage of the coating layer. Specifically, the metal particles 3 are supported in the range of 1% by mass to 10% by mass with respect to the mass of the carrier particle 1.

From the viewpoint of exhibiting the carrier effect, the coverage of the coating layer 2 is preferably 5% or more, more preferably 10% or more, still more preferably 20% or more. From the viewpoint of flowability, the coverage is preferably 50% or less, more preferably 40% or less. The carrier effect means that supporting a catalyst on a carrier enhances the catalytic activity as compared with in a state not supported on a carrier.

The coverage of the coating layer is the ratio (%) of the mass of the carbon nanotube coating layer to the total mass of the carbon nanotube-coated catalyst particles. The coverage can be measured by observing weight change with temperature of carbon nanotube-coated particles while raising the temperature in the range of from room temperature to 900° C. using a thermobalance analyzer.

The type of the metal nanoparticles is appropriately determined according to the purpose. For example, ruthenium, iron, nickel or the like may be used to form a catalyst for ammonia decomposition. Nickel or the like may be used to form a catalyst for dry methane reforming. Iron, cobalt or the like may be used to form a catalyst for Fischer-Tropsch reaction.

For formation of an ammonia decomposition catalyst, from the viewpoint of ammonia decomposition reaction activity, it is preferable to contain at least one selected from the group consisting of ruthenium, iron and nickel, and it is more preferable to contain nickel and/or ruthenium. These may be used alone or in combination of two or more, and not only alloys but also oxides or nitrides may be used. In the present specification, metal nanoparticles include oxides and nitrides.

The smaller the particle size of the metal nanoparticles (also referred to as catalyst metal particles), the higher the catalytic activity. Therefore, the particle size is preferably 50 nm or less, more preferably 10 nm or less. The lower limit of the particle size of the catalyst metal particles is not particularly limited, but usually is 5 nm or more. The particle size of the metal nanoparticles can be determined by a TEM image.

From the viewpoint of catalytic activity and activity stability, the amount of the metal nanoparticles is, but not particularly limited to, preferably 2% by mass or more, more preferably 5% by mass or more, particularly preferably 10% by mass or more of the whole catalyst particles. From the viewpoint of supporting highly dispersed catalyst metal, the amount is preferably 50% by mass or less, more preferably 40% by mass or less of the whole catalyst particles. The amount of metal nanoparticles can be determined by chelatometric titration or element analysis by a fluorescent X-ray analyzer.

Doping carbon nanotubes with nitrogen or boron increases the electrical conductivity of the carbon nanotubes. Such carbon nanotube-coated catalyst particles are expected to be applied to catalysts of acid polymer electrolyte membranes used in fuel cells. In nitrogen-doped carbon nanotubes, the carrier effect of the carbon nanotubes can also be increased, for reasons such as increases in defects in graphene sheets.

The doping amount of nitrogen or boron is preferably 1% by mass or more, more preferably 5% by mass or more based on the mass of the whole catalyst particles. From the viewpoint of catalyst stability, the amount is preferably 15% by mass or less, more preferably 10% by mass or less based on the mass of the whole catalyst particles. The amount of doping can be determined by X-ray photoelectron spectroscopy. As a result of doping with nitrogen or boron, nitrogen or boron doped in the carbon nanoparticles functions as a catalyst. Also, the dopant element donates electrons to the catalyst metal to increase catalytic activity.

Doping with nitrogen or boron also changes physical properties such as electrical conductivity, such as by increasing defects in graphene sheets in the carbon nanotubes. Improvement in catalytic activity can be expected through combination of supporting metal nanoparticles on carbon nanotubes and doping the carbon nanotubes with nitrogen or boron.

Carbon-nanotube-coated catalyst microparticles can be observed using a scanning electron microscope (SEM) or a transmission electron microscope (TEM). Energy dispersive X-ray analysis (EDX) can also be used for analysis.

Process for Producing Carbon-Nanotube-Coated Catalyst Particle

In one embodiment of the present invention, the process for producing carbon nanotube-coated catalyst particles comprises the steps of (1) supporting metal particles on carrier particle surfaces; (2) growing carbon nanotubes from the metal particles as a base point; and, (3) supporting metal nanoparticles on the carbon nanotubes and/or doping the carbon nanotubes with nitrogen or boron. The process of producing carbon nanotube-coated catalyst particle in one embodiment of the present invention is described in detail below.

(1) Step of Supporting Metal Particles on Carrier Particle Surfaces

The step of supporting metal particles on carrier particle surfaces is not particularly limited as long as the metal particles can be supported on the carrier particles. Examples of the step include an impregnation method and a coprecipitation method.

Specifically, for example, iron can be supported as metal particles by preparing a solution of an iron-containing salt, impregnating alumina with the salt containing solution and then carrying out calcination.

Examples of the salt-containing solution include aqueous nitrate solution, aqueous chloride solution, aqueous hexaamine chloride solution, aqueous dinitrodiamine nitrate solution, and hexachloro acid hydrate.

Next, a mixture of metal particles and carrier particles in which alumina is impregnated with a solution of iron-containing salt is calcinated in an inert gas atmosphere, and then subjected to a reduction treatment in a hydrogen atmosphere. Calcination and reduction may be carried out in a temperature range of 300 to 700° C. for 1 to 12 hours. Examples of the inert gas which can be used include $N_2$ gas or Ar gas.

An example of a method for preparing iron particle-carrying alumina ($Fe/Al_2O_3$) using the impregnation method will be described below.

First, γ-alumina and an Fe precursor, iron nitrate enneahydrate ($Fe(NO_3)_2 \cdot 9H_2O$, Wako Pure Chemicals) are stirred in ion exchanged water. At this time, the preparation is carried out such that 3 to 40 wt % Fe is supported. Next, water is evaporated from the mixture using a rotary evaporator. Thereafter, the resultant is subjected to calcination at 700° C. for 2 hours under an Ar gas flow before a reduction treatment at 700° C. for 1 hour under a hydrogen gas flow, resulting in obtaining a Fe-supported γ-alumina.

(2) Step of Growing Carbon Nanotubes

In this embodiment, carbon nanotube-coated catalyst particles are prepared by CVD method.

When various hydrocarbons and carbon monoxide contact with the supported metal particles at high temperature, carbon nanotubes grow from the metal particles on the carrier particles as a base point due to the graphitizing ability of the metal particles. Methods for bringing carrier particles carrying metal particles into contact with carbon-containing materials as a carbon source include a method comprising holding the carrier particles carrying metal particles in a heating furnace, supplying the carbon source into the heating furnace and bringing them into contact with each other in the heating furnace (fixed bed); and a method comprising allowing the carrier particles carrying metal particles to flow in a heating furnace, supplying the carbon source into the heating furnace and bringing them into contact with each other in the heating furnace (fluidized bed CVD). By forming carbon nanotubes on carrier particles by fluidized bed CVD, catalytic particles usable in fluidized bed reactions can be easily obtained. The present inventors presume that synthesis by, fluid bed CVD leads to entangled and scraped growth of carbon nanotubes, so that carbon nanotubes are coated on the surface of individual carrier particles. Finally, hardly-entangling particles that can be used as a catalyst in fluidized bed reactions are obtained. It is noted that the term "usable in fluidized bed reactions" as used herein means being flowable in fluidized bed reactions.

The carbon source is not limited as long as it becomes gaseous under the temperature condition of 300 to 1000° C. For example, methane, acetylene, benzene, toluene, methanol, ethanol, carbon monoxide, natural gas or the like can be used. They may be used alone or in combination. From the viewpoints of convenience of handling and safety of the carbon source, an alcohol such as methanol or ethanol is preferably used.

As a CVD reaction tube, for example, a quartz tube can be used. A quartz dispersion plate may be provided in the reaction tube. For heating, for example, an electric furnace or a high-frequency induction heating furnace can be used. From the viewpoint of yield, the reaction temperature is usually 300° C. or higher, preferably 400° C. or higher, more preferably 500° C. or higher, and from the viewpoints of constraints on the material of the reaction vessel and of decomposition of the generated carbon nanotubes, the reaction temperature is usually 1000° C. or less, preferably 900° C. or less, more preferably 700° C. or less.

In this embodiment, an inert gas such as $N_2$ gas may be passed to make the inside of the reaction tube a fluidized bed. Into a reaction tube through which an inert gas is passed and which has been heated to a predetermined temperature by an electric furnace or the like, a source gas is introduced. The mixing ratio, partial pressures, temperatures and the like of the inert gas and the source gas are appropriately adjusted depending on the intended catalyst particles. For example, the carbon source gas is adjusted to be 5% by volume to 40% by volume in a fluidized bed. Preferably, it is adjusted to 10% by volume to 30% by volume. While the fluidized bed CVD process is being performed, the flow state deteriorates with the growth of the carbon nanotubes, but the synthesis can be terminated in any reaction time while forming the fluidized bed.

(3) Step of Supporting Metal Nanoparticles on Carbon Nanotube and/or Doping Carbon Nanotube with Nitrogen or Boron Metal nanoparticles functioning as a catalyst can be supported on carbon nanotube-coated particles after the step (2), that is, after supporting the metal particles on carrier particles and then growing carbon nanotubes from the metal particles as a base point.

A method of supporting metal nanoparticles on carbon nanotube-coated particles will be described below.

For example, in the case of supporting Ni nano-particles, carbon nanotube-coated particles obtained by CVD and an Ni precursor (nickel nitrate hexahydrate, $Ni(NO_3)_2.6H_2O$, Wako Pure Chemicals) and urea are stirred in ion exchanged water for 12 to 24 hours. Urea is a dispersant added for the purpose of adsorbing $Ni^{2+}$ ionized in ion exchanged water onto carbon nanotubes. After stirring, water is evaporated from the mixture obtained by the stirring, using a rotary evaporator. Next, the resultant is subjected to calcination at 700° C. for 2 hours under a flow of an inert gas such as Ar gas, before a reduction treatment at 700° C. for 1 hour under a hydrogen gas flow, resulting in obtaining a Ni-carrying carbon nanotube catalyst particle. The temperature condition of the calcination/reduction treatment may be changed between 300° C. and 700° C.

Nitrogen or boron functioning as a catalyst can be doped into carbon nanotube-coated particles after the step (2), that is, after supporting metal particles on carrier particles and then growing carbon nanotubes from the metal particles as a base point. Also, nitrogen or boron can be doped into carbon nanotubes by introducing a mixed gas of a carbon-containing material and a nitrogen-containing material or a boron-containing material into a CVD reactor and allowing them to react. Thus, step (2) and step (3) may be performed at the same time.

For the method of doping carbon nanotube-coated particles with nitrogen or boron, the same method as the method of supporting metal nanoparticles also can be used. Examples of such a method include a method comprising dissolving a nitrogen-containing material or a boron-containing material to be a precursor in an appropriate solvent, impregnating the carbon nanotube-coated particles with the resultant solution, removing the solvent, and performing a calcination/reduction treatment.

Examples of the nitrogen-containing material include ammonia, benzylamine, and ammonium chloride.

Examples of the boron-containing material include boric acid, triisopropyl borate, boron oxide, boron trifluoride, sodium borohydride, monoborane, diborane, and trimethylboron.

The amount of doping can be controlled by adjusting the ratio between the carbon-containing material and the nitrogen- or boron-containing material, and for CVD, by adjusting the partial pressure, the temperature, and the like.

After completion of the reaction, the catalyst particles may be used in a state as they have been synthesized, but are preferably purified. Methods of purification include a method of performing a heat oxidation treatment at 400° C. or more and 500° C. or less, preferably at about 450° C.

The carbon nanotube-coated catalyst particles of the present invention can be used in a reaction in a fixed bed reactor or in a reaction in a fluidized bed reactor.

In the fixed bed reactor, the catalyst particles can be molded into a fixed shape and used. The shape of the molded body may be granular, pellet, ring, honeycomb, or the like. The above-described catalyst particles may also be used in a state of being coated on the surface of a structure formed into a monolith, ring, sphere or the like such as a honeycomb.

Figure 2:
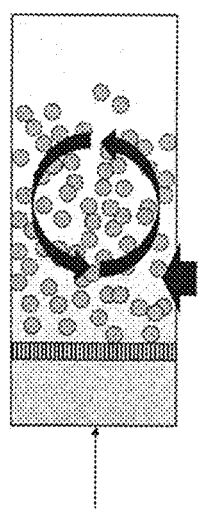
FIG. 2 is a schematic view showing a state in a fluidized bed reaction.

The carbon nanotube-coated catalyst particles of this embodiment can be easily handled even in a fluidized bed reactor to which carbon nanotube-coated catalyst particles have conventionally been difficult to apply because of projection of carbon nanotubes from the fluidized bed and a high aspect ratio of the carbon nanotube itself, and can exert high catalytic activity while the catalyst flows due to inflow of gas. FIG. 2 is a schematic view showing a state in a fluidized bed reactor. As shown in FIG. 2, in a fluidized bed reaction, gas flows upward from the bottom of the reactor as indicated by the arrow below the reactor. Then, as indicated by the arrow in the reactor, the catalyst particles flow in the fluidized bed, whereby the in-bed heat transfer becomes favorable. This is thought to promote heat transfer and mass transfer, thereby further improving reaction efficiency.

In addition, since the carbon nanotube-coated catalyst particles of this embodiment have a substantially spherical shape and have a structure in which carrier particles are covered with carbon nanotubes with supported metal particles as a base point, they are difficult to aggregate and are likely to flow stably. Therefore, the carbon nanotube-coated catalyst particles can suppress operational problems intrinsic to fluidized bed reactions, that is, pressure fluctuations and the like, and can be used without problems of maintenance and management of the fluidized bed reactor. In a fluidized bed reaction, when an object, for example, a quartz plate is present in the bed of the fluidized bed, a large force is variably applied to the object, which may cause damage to the object. Since the carbon nanotube-coated catalyst particles of this embodiment are light, hard to aggregate and easy to flow stably, breakage of such an object can also be avoided. Changes in the flow state accompanying the growth of carbon nanotubes can be dealt with, for example, by shortening the reaction time. The substantially spherical shape means that when a carbon nanotube-coated catalyst particle is observed using an electron microscope, the ratio of the longest and shortest diameter of the carbon nanotube-coated catalyst particle is 2 or less.

As described above, the carbon nanotube-coated catalyst particles of this embodiment can be produced with commercially available raw materials using known methods. Thus, according to the present invention, excellent carbon nanotube-coated catalyst particles having high catalytic activity and usable in fluidized bed reactions can be produced from inexpensive raw materials using existing facilities, thereby being obtained at low production cost.

As an example of the method of using the carbon nanotube-coated catalyst microparticles of the present invention, use in an ammonia decomposition step will be described below.

As a catalytic reactor using the carbon nanotube-coated catalyst microparticles of the present invention in an ammonia decomposition step, a plug flow reactor (continuous) and a continuous stirred tank reactor can be used. A catalyst bed using the carbon nanotube-coated catalyst microparticle of the present invention is preferably used as a fluidized bed. An example of materials of the catalytic reactor includes stainless steels, and SUS 316 is preferable.

In the case of using a fluidized bed reactor, under a high temperature condition of about 700° C., a high ammonia conversion rate can be achieved even when the ammonia flow rate increases.

The reaction temperature in the reactor can be measured with a type K thermocouple produced by CHINO provided in the catalyst bed. The reaction temperature is preferably 400° C. or higher, more preferably 500° C. or higher, from the viewpoint of ammonia conversion. The reaction temperature is preferably 800° C. or lower, more preferably 700° C. or lower.

From the viewpoint of equilibrium of ammonia decomposition, the pressure in the reactor is more advantageous as the pressure becomes lower. However, decompression requires power. Thus, in this embodiment, the pressure in the reactor is preferably about atmospheric pressure.

An inert Ar gas or the like may flow as a carrier gas into the catalytic reactor. For the gas flow rate, from the viewpoint of reaction efficiency, the ammonia gas flow rate per catalyst load is preferably 100 ml/(min·gcat) or more, more preferably 250 ml/(min·gcat) or more, and is preferably 500 ml/(min·gcat) or less, more preferably 300 ml/(min·gcat) or less. The supply amount of the gas is a unit representing a gas flow rate in the normal notation and represents the flow rate of the gas in the state of 0° C., 1 atm (atmospheric pressure) (reference state).

Biomass with high moisture content such as sewage sludge, nightsoil, livestock excreta and food waste is fermented in a methane fermentation tank and almost the same amount of digestive juice (aqueous waste) as raw material is produced together with methane gas. This aqueous waste contains ammonia nitrogen. Ammonia obtained from waste which is digestive juice containing ammonia nitrogen can be decomposed to obtain hydrogen. Decomposing ammonia to hydrogen and extracting hydrogen energy leads to the use of renewable energy. There is a demand for hydrogen such as fuel cell electric vehicles, stationary fuel cells, hydrogen power plants, and peripheral infrastructure, which are related to hydrogen energy, not only in Japan but also in the world. Utilizing the carbon nanotube-coated catalyst particles of this embodiment makes it possible to extract hydrogen energy with high efficiency. Furthermore, heat of reaction can be supplied to the catalyst bed.

EXAMPLES

The present invention will be described in more detail below with reference to Examples, but the present invention is not limited to the following Examples provided the gist thereof is not exceeded.

Experimental Example 1: Synthesis of Catalyst Particles

Step (1)

Basic γ-alumina (Wako Pure Chemicals) having a particle size range of 75 to 150 μm (average particle size: 100 μm) and iron nitrate nonahydrate ($Fe(NO_3)_2 \cdot 9H_2O$, Wako Pure Chemicals) were stirred in ion exchanged water for 24 hours. The amount of supported Fe was adjusted to be 3% by mass. Water was evaporated from the stirred mixture using a rotary evaporator to obtain Fe-carrying γ-alumina. The Fe-carrying γ-alumina was heated to 500° C. over 1 hour under an Ar gas flow and then calcinated for 2 hours. Then, the resultant was subject to a reduction treatment under a hydrogen gas flow at 500° C. for 2 hours.

Step (2)

After the calcination and reduction treatment, the Fe-carrying γ-alumina was used to synthesize carbon nanotubes using fluid bed CVD. Ethanol was used as a carbon source compound. In a quartz reaction tube having a quartz dispersion plate, a fluidized bed was formed using nitrogen gas during which the temperature was raised to 700° C. with an electric furnace. While confirming that the fluidized bed was formed stably, volatilized ethanol was supplied to the fluidized bed. The supplied ethanol was adjusted to be 25% by volume in the fluidized bed. In this example, the synthesis time was 15 minutes.

Step (3)

Ten percent by mass of Ni was supported on the carbon nanotube-coated particles obtained in the above-described step.

The carbon nanotube-coated particles obtained in the above-described step, an aqueous Ni precursor solution (nickel nitrate hexahydrate, $Ni(NO_3)_2 \cdot 6H_2O$, Wako Pure Chemicals) and urea (Wako Pure Chemicals) were mixed in a molar ratio of 1:1 and stirred for 24 hours in ion exchange water. Then, water was evaporated from the mixture of the carbon nanotube-coated particles and Ni precursors using a rotary evaporator to obtain Ni-supported carbon nanotube-coated particles. The Ni-carrying carbon nanotube-coated particles were calcinated at 500° C. for 2 hours under an Ar gas flow. Subsequently, the resultant was subject to a reduction treatment under a hydrogen gas flow at 500° C. for 1 hour. The coverage of the coating layer of the obtained carbon nanotube-coated catalyst particles was 10%.

Experimental Example 2: Synthesis of Catalyst Particles

Step (1)

Basic γ-alumina (Wako Pure Chemicals) having a particle size range of 75 to 150 μm (average particle size: 100 μm) and iron nitrate nonahydrate ($Fe(NO_3)_2 \cdot 9H_2O$, Wako Pure Chemicals) were stirred in ion exchanged water for 24 hours. The amount of supported Fe was adjusted to be 20% by mass. Water was evaporated from the stirred mixture using a rotary evaporator to obtain Fe-carrying γ-alumina. The Fe-carrying γ-alumina was heated to 500° C. over 1 hour under an Ar gas flow and then calcinated for 2 hours. Then, the resultant was subject to a reduction treatment under a hydrogen gas flow at 500° C. for 2 hours.

Step (2)

After the calcination and reduction treatment, the γ-alumina supporting 20% by mass of Fe was used to synthesize carbon nanotubes using fluid bed CVD. Ethanol was used as a carbon source compound. In a quartz reaction tube having a quartz dispersion plate, a fluidized bed was formed using nitrogen gas during which the temperature was raised to 600° C. with an electric furnace. While confirming that the fluidized bed was formed stably, volatilized ethanol was supplied to the fluidized bed. The supplied ethanol was adjusted to be 25% by volume in the fluidized bed. In this example, the synthesis time was 1 hour. The coverage of the coating layer of the carbon nanotube-coated catalyst particles thus synthesized was 50%.

Experimental Example 3

The ammonia conversion rate in a fixed bed reactor was examined using the Ni-carrying carbon nanotube-coated particles synthesized in Experimental Example 1.

Ammonia decomposition tests were carried out at reaction temperatures of 873 K (600° C.), 923 K (650° C.), and 973 K (700° C.) and at an ammonia flow rate of 1250 to 6200 ml/(min·$g_{cat}$). The volumetric flow rate of the produced gas was measured with a soap-film flowmeter to calculate the ammonia conversion rate.

An $Ni/Al_2O_3$ catalyst (supported-Ni amount: 10% by mass) was prepared by a wet impregnation method, and the ammonia conversion rate was measured in the same manner as the Ni-carrying carbon nanotube-coated particles. First, an $Ni/Al_2O_3$ catalyst was prepared using nickel nitrate hexahydrate ($Ni(NO_3)_2 \cdot 6H_2O$) as a precursor so that 10% by mass of Ni was supported. Next, a mixture of the catalyst metal and the carrier was calcinated at 700° C. for 2 hours under an Ar gas flow and subject to reduction treatment at 700° C. for 1 hour under an $H_2$ gas flow to obtain an $Ni/Al_2O_3$ catalyst.

Figure 3:
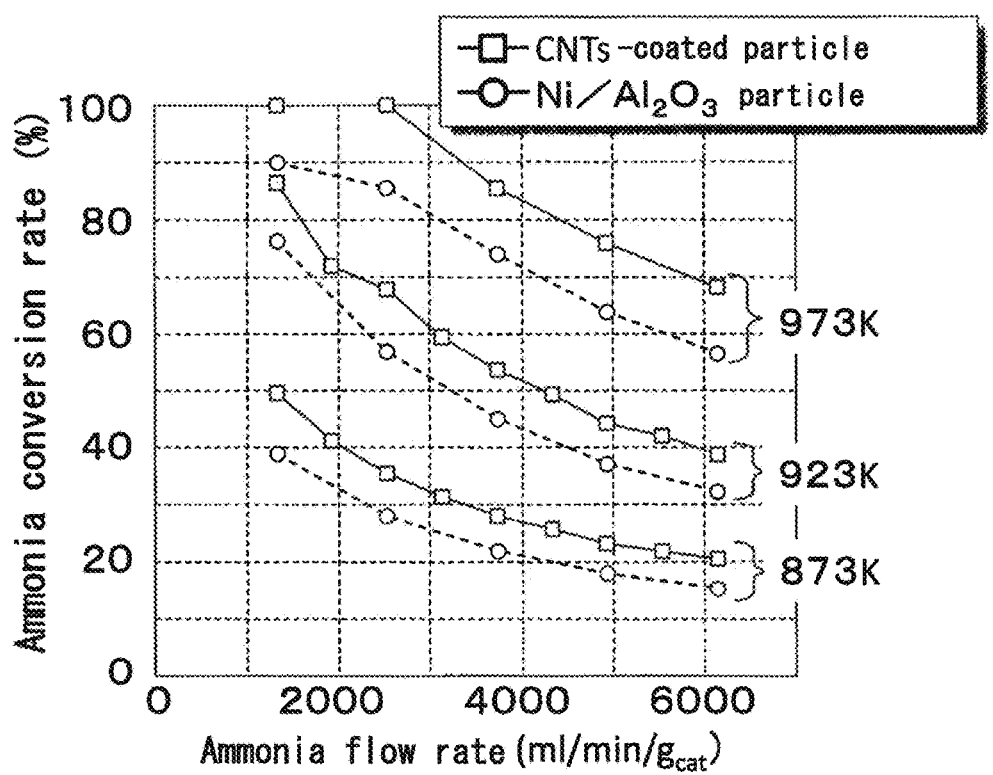
FIG. 3 is a graph showing the relationship between flow rate and ammonia conversion rate in ammonia decomposition reaction.

The results are shown in FIG. 3. It is seen from FIG. 3 that the nickel-carrying carbon nanotube-coated catalyst particles (open square mark: CNTs particles) have a higher active effect than the $Ni/Al_2O_3$ catalyst (open circle mark: $Ni/Al_2O_3$ particles).

Experimental Example 4

The ammonia conversion rate in a fluidized bed reactor was examined using the catalyst particles synthesized in Experimental Example 1. As in Experimental Example 3, ammonia conversion rates at reaction temperatures of 873 K (600° C.), 923 K (650° C.), and 973 K (700° C.) and at an ammonia flow rate of 1250 to 6200 ml/(min·$g_{cat}$) were determined.

Figure 4:
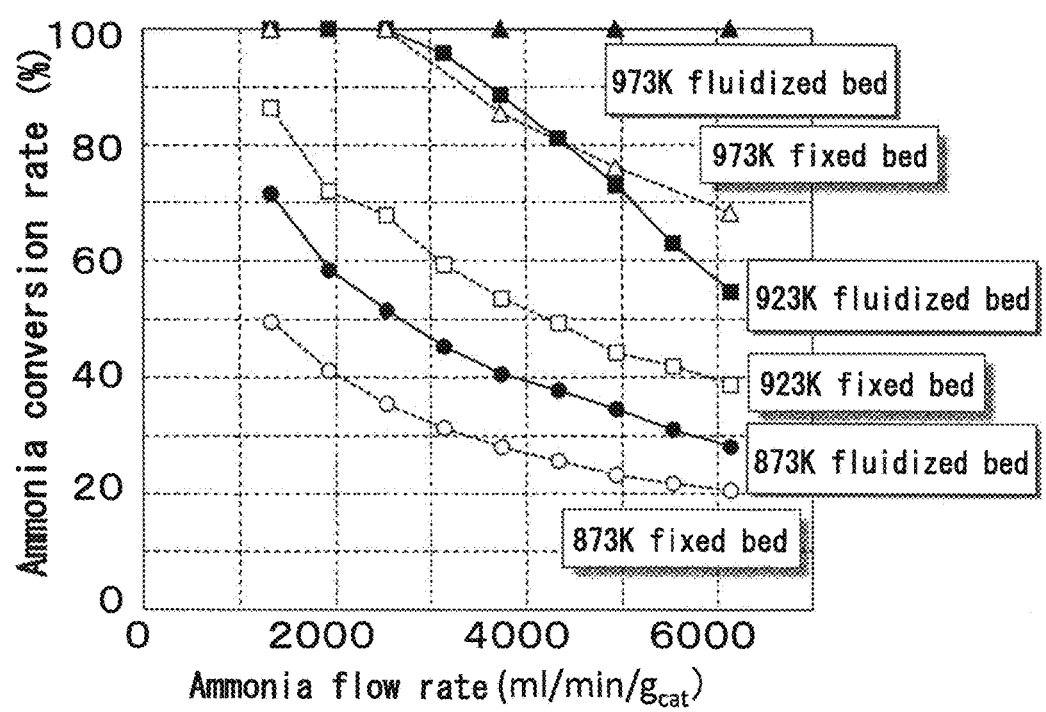
FIG. 4 is a graph showing the relationship between flow rate and ammonia conversion rate in ammonia decomposition reaction.

The results are shown in FIG. 4. FIG. 4 also shows the results of Experimental Example 3 with the fixed bed reactor in combination. The carbon nanotube-coated catalyst particles of the present invention exhibited higher ammonia conversion rates when used in the fluidized bed reactor than when used in the fixed bed reactor. It can be seen that at the same conversion rate, approximately 2 times more ammonia can be processed in the fluidized bed reactor compared to in the fixed bed reactor.

From the above, it was shown that the carbon nanotube-coated catalyst particles according to the present invention can be easily and inexpensively produced by known methods and can stably maintain a favorable fluidized state inside a catalyst fluidized bed, and have high catalytic activity.

INDUSTRIAL APPLICABILITY

The carbon nanotube-coated catalyst particle of the present invention is usable in fluidized bed reactions, is easy to handle and has high catalytic activity. The catalyst particle also can be used in energy conversion processes from biomass and thus is very useful in industrial applications.

The invention claimed is:
1. A method of ammonia decomposition, comprising decomposing ammonia using a carbon nanotube-coated catalyst particle comprising a carrier particle and a coating layer disposed on a surface of the carrier particle, wherein:
   the carrier particle is flowable in a fluidized bed;
   the coating layer comprises a carbon nanotube which has a metal nanoparticle supported thereon and/or which has been doped with nitrogen or boron;
   the coverage of the coating layer comprising the carbon nanotube is 10% or more and 50% or less; and
   the catalyst particle is flowable in a fluidized bed reaction.
2. The method of ammonia decomposition according to claim 1, wherein the carrier particle is a porous ceramic particle.
3. The method of ammonia decomposition according to claim 2, wherein the porous ceramic particle includes at least one compound selected from the group consisting of alumina, silica, zeolite, titanium oxide, zirconia, lanthanum oxide, and ceria.

4. The method of ammonia decomposition according to claim 1, wherein the metal nanoparticle includes at least one element selected from the group consisting of ruthenium, iron, and nickel.

5. The method of ammonia decomposition according to claim 1, wherein the carbon nanotube-coated catalyst particle is used as a catalyst in a fluidized bed reaction.

6. The method of ammonia decomposition according to claim 3, wherein the porous ceramic particle includes alumina.

7. The method of ammonia decomposition according to claim 3, wherein the porous ceramic particle includes silica.

8. The method of ammonia decomposition according to claim 3, wherein the porous ceramic particle includes zeolite.

9. The method of ammonia decomposition according to claim 3, wherein the porous ceramic particle includes titanium oxide.

10. The method of ammonia decomposition according to claim 3, wherein the porous ceramic particle includes zirconia.

11. The method of ammonia decomposition according to claim 3, wherein the porous ceramic particle includes lanthanum oxide.

12. The method of ammonia decomposition according to claim 3, wherein the porous ceramic particle includes ceria.

13. The method of ammonia decomposition according to claim 4, wherein the metal nanoparticle includes ruthenium.

14. The method of ammonia decomposition according to claim 4, wherein the metal nanoparticle includes iron.

15. The method of ammonia decomposition according to claim 4, wherein the metal nanoparticle includes nickel.

16. The method of ammonia decomposition according to claim 1, wherein the carbon nanotube has been doped with nitrogen.

17. The method of ammonia decomposition according to claim 1, wherein the carbon nanotube has been doped with boron.

18. The method of ammonia decomposition according to claim 1, wherein the coverage of the coating layer comprising the carbon nanotube is 20% or more and 50% or less.

19. The method of ammonia decomposition according to claim 1, wherein the coverage of the coating layer comprising the carbon nanotube is 10% or more and 40% or less.

20. The method of ammonia decomposition according to claim 1, wherein the coverage of the coating layer comprising the carbon nanotube is 20% or more and 40% or less.

* * * * *